(12) United States Patent
Komori et al.

(10) Patent No.: US 10,944,301 B2
(45) Date of Patent: Mar. 9, 2021

(54) LAMINATE FOR USE IN CORE

(71) Applicant: TOYOTA JIDOSHA KABUSHIKI KAISHA, Toyota (JP)

(72) Inventors: Kensuke Komori, Toyota (JP); Shingo Fubuki, Toyota (JP); Shinya Urata, Nagakute (JP); Yoshitaka Maeda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 16/428,121

(22) Filed: May 31, 2019

(65) Prior Publication Data
US 2019/0379246 A1 Dec. 12, 2019

(30) Foreign Application Priority Data

Jun. 11, 2018 (JP) .............................. JP2018-111380

(51) Int. Cl.
*H02K 1/06* (2006.01)
*H02K 1/02* (2006.01)
*H01F 27/25* (2006.01)

(52) U.S. Cl.
CPC ............... *H02K 1/06* (2013.01); *H01F 27/25* (2013.01); *H02K 1/02* (2013.01)

(58) Field of Classification Search
CPC ................................... H01F 27/25; H02K 1/06
See application file for complete search history.

(56) References Cited

U.S. PATENT DOCUMENTS

| 5,477,096 | A | * | 12/1995 | Sakashita | ................. | H02K 1/06 |
| | | | | | | 310/216.016 |
| 7,777,389 | B2 | * | 8/2010 | Abe | ........................ | H02K 1/16 |
| | | | | | | 310/216.111 |
| 8,174,156 | B2 | * | 5/2012 | Nakahara | ................. | H02K 1/02 |
| | | | | | | 310/59 |
| 9,728,321 | B2 | * | 8/2017 | Kazakov | ............. | H01F 27/2847 |
| 2004/0245883 | A1 | * | 12/2004 | Mitcham | ................. | H02K 1/20 |
| | | | | | | 310/261.1 |

(Continued)

FOREIGN PATENT DOCUMENTS

| JP | 2004-42345 A | 2/2004 |
| JP | 2008-213410 A | 9/2008 |
| WO | 2007/116937 A1 | 10/2007 |

OTHER PUBLICATIONS

Keiyu Nakagawa et. al., "The Effect of the Jetting Temperature on the Fabrication of Rapidly Solidified Fe—Si—B Systems Alloys Using Single Roller Melt Spinning" J. Japan Inst. Met. Mater., vol. 73, No. 10 (2009), pp. 764-767.

*Primary Examiner* — Alexander Talpalatski
(74) *Attorney, Agent, or Firm* — Oliff PLC

(57) ABSTRACT

Provided is a laminate having a reduced loss ratio while maintaining a high space factor. The present disclosure relates to a laminate for use in a core, comprising: a strip laminate composed of soft magnetic metal strips; and an insulating layer provided on a surface of the strip laminate, wherein each one layer of the soft magnetic metal strips has a thickness of 100 μm or less, each one layer of the soft magnetic metal strips has an oxide film on their surfaces, the strip laminate is composed of at least two layers of the soft magnetic metal strip, and the strip laminate and the insulating layer are alternately disposed.

12 Claims, 3 Drawing Sheets

(56) References Cited

U.S. PATENT DOCUMENTS

2009/0181259 A1 7/2009 Kurihara et al.
2011/0095642 A1* 4/2011 Enomoto .................. H01F 3/04
310/216.045

* cited by examiner

LAMINATE FOR USE IN CORE

CROSS REFERENCE TO RELATED APPLICATIONS

The present application claims priority from Japanese patent application JP 2018-111380 filed on Jun. 11, 2018, the content of which is hereby incorporated by reference into this application.

BACKGROUND

Technical Field

The present disclosure relates to a laminate for use in a motor core or the like.

Description of Related Art

Magnetic components are used in the core part and the like of various motors provided in vehicles, including driving motors provided in hybrid vehicles and electric vehicles. Technologies for increasing the efficiency and the gain of such magnetic components are developed on a daily basis.

For example, JP 2008-213410 A discloses a laminate sheet for stamping obtained by laminating a plurality of soft magnetic metal strips each having a thickness of 8 µm to 35 µm, wherein a thickness of a thermosetting resin interposed between the metal strips is 0.5 µm to 2.5 µm, and a total thickness of the laminate sheet is 50 µm to 250 µm.

WO 2007/116937 A1 discloses a soft magnetic metal strip laminate comprising metal strips that have strong adhesion to each other, wherein a plurality of soft magnetic metal strips are laminated by using a polyamide acid solution, and the space factor in the laminating direction is 95% or more.

JP 2004-42345 A discloses an amorphous metal magnetic laminate sheet having high mechanical strength and comprising a laminate formed from an amorphous metal magnetic strip, wherein in the laminate formed from an amorphous metal magnetic strip, a heat resistant resin layer and an amorphous metal magnetic strip layer are alternately laminated, the heat resistant, resin layer has a resin weight reduction of 1 wt % or less resulting from thermal decomposition after undergoing thermal history at 300° C. for 1 hour in a nitrogen atmosphere stream, and moreover the amorphous metal magnetic strip layer is composed of an amorphous metal layer having a tensile strength of 500 MPa or less and an amorphous metal layer having a tensile strength of 500 MPa or more.

SUMMARY

However, in the laminate of conventional art, one resin layer (insulating layer) is disposed between one soft magnetic metal strip layer and another soft magnetic metal strip layer in order to reduce the loss ratio, and thus the proportion of the resin layer per unit volume of the laminate may be increased, or that is to say, the space factor may be reduced.

Accordingly, the present disclosure provides a laminate having a reduced loss ratio while maintaining a high space factor.

In a laminated motor core, the smaller the thickness of the laminated soft magnetic metal strips is, the smaller the motor loss is. That is to say, in a laminated motor core obtained by laminating thin soft magnetic metal strips (which are foils of a soft magnetic metal material and also referred to as "soft magnetic foils" in this specification and the like, and details of which will be described below), the eddy current is smaller than that of a laminate of thick soft magnetic metal strips, and thus the eddy current loss is reduced. Accordingly, in order to reduce the motor loss, it is contemplated that a soft magnetic metal strip is thinned and formed into a foil.

On the other hand, when there is electrical conduction between soft magnetic metal strips, the eddy current is increased, thus leading to a large eddy current loss. That is to say, in a laminated motor core not including a component that obstructs electrical conduction, i.e., an insulating layer, between soft magnetic metal strips, the eddy current is greater than that of a motor core including an insulating layer as the number of soft magnetic metal strip layers is increased, and thus the eddy current loss is increased. Accordingly, an insulating layer may be disposed between soft magnetic metal strips so as not to allow interlayer electrical conduction.

Therefore, it is contemplated that a laminated motor core is produced by laminating soft magnetic foils to reduce the eddy current loss and, moreover, an insulating layer is disposed between the soft magnetic foils to prevent interlayer electrical conduction. However, disposing an insulating layer between every two soft magnetic foils results in a greatly reduced space factor in the laminated motor core. A soft magnetic foil laminated motor core produced in such a manner has magnetic properties inferior to a conventional laminated motor core (a conventional product) that has the same volume and that is produced by alternately laminating a soft magnetic metal strip and an insulating layer, and in order to obtain the same performance as the conventional product, the volume of the soft magnetic foil laminated motor core may be increased.

Thus, as a result of intensive studies, the present inventors have found that a loss ratio can be reduced while maintaining a high space factor by using a soft magnetic foil having a specific thickness and having an oxide film on the surface as a soft magnetic metal strip and disposing one insulating layer for every plurality of layers of the soft magnetic foil in a laminate for use in a core, and accomplished the present disclosure.

For example, exemplary embodiments are as follows.

(1) A laminate for use in core, comprising:

at least one strip laminate composed of soft magnetic metal strips; and at least one insulating layer provided on a surface of the strip laminate, wherein each one layer of the soft magnetic metal strips has a thickness of 100 µm or less, each one layer of the soft magnetic metal strips has an oxide film on surfaces thereof, the strip laminate is composed of at least two layers of the soft magnetic metal strip, and the strip laminate and the insulating layer are alternately disposed.

(2) The laminate according to (1), wherein each one layer of the soft magnetic metal strips has a thickness of 10 µm to 100 µm, and the strip laminate is composed of 2 layers to 20 layers of the soft magnetic metal strip.

(3) The laminate according to (1) or (2), wherein each one layer of the insulating layers has a resistance value of 1000 Ω·m or more.

(4) A core comprising the laminate according to (1).

Effect

The present disclosure provides a laminate having a reduced loss ratio while maintaining a high space factor.

DETAILED DESCRIPTION OF THE EMBODIMENTS

Figure 1:
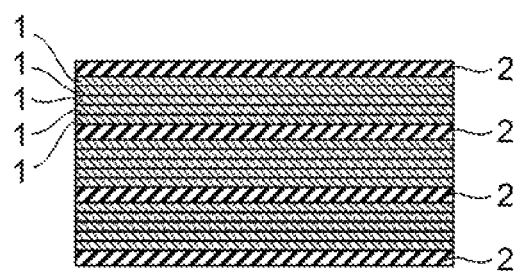
FIG. 1 shows one example of the laminate structure of the laminate of the present disclosure.

Below, some embodiments of the present disclosure will now be described in detail.

Herein, features of the present disclosure are described in reference to the drawings as appropriate. In the drawings, emphasis is placed on the sizes and shapes of the components for clarity, and the drawings do not accurately represent the actual sizes and shapes. Accordingly, the technical scope of the present disclosure is not limited to the sizes and shapes of the components shown in the drawings. The laminate of the present disclosure is not limited to the following embodiments, and can be practiced in variously altered or modified forms as can be done by those skilled in the art without departing from the gist of the present disclosure.

The present disclosure relates to a laminate for use in core, comprising:

at least one strip laminate composed of soft magnetic metal strips; and at least one insulating layer provided on a surface of the strip laminate, wherein each one layer of the soft magnetic metal strips has a thickness within a specific range, each one layer of the soft magnetic metal strips has an oxide film on surfaces thereof, the strip laminate is composed of a plurality of layers of the soft magnetic metal strip, and the strip laminate and the insulating layer are alternately disposed.

In the present disclosure, the soft magnetic metal strip refers to a ribbon of a metal, the magnetic polarity of which is inverted with comparative ease (generally the coercivity is 800 A/m or less).

Each one layer one piece) of the soft magnetic metal strips in the present disclosure has a thickness of 100 μm or less, 10 μm to 100 μm in some embodiments, and 20 μm to 50 μm in some other embodiments. A thin soft magnetic metal strip having such a thickness is also referred to as a "soft magnetic foil" in the specification and the like.

Due to the soft magnetic metal strip being a soft magnetic foil having a thickness within the above range, the motor loss can be reduced in a laminated motor core produced with the laminate of the present disclosure.

A soft magnetic foil heretofore known in the art is usable as a soft magnetic foil, and examples include soft magnetic foils composed of iron (Fe) and/or cobalt (Co) as a base metal and at least one element selected from the group consisting of boron (B), silicon (Si), phosphorus (P), copper (Cu), zirconium (Zr) and niobium (Nb), as an alloying element.

In the soft magnetic foil, the amount of Fe and/or Co is usually 80 at % or more, and 80 at % to 90 at % in some embodiments, based on the total number of atoms of all elements in the soft magnetic foil.

In the soft magnetic foil, the amount of alloying element is usually 20 at % or less, and 10 at % to 20 at % in some embodiments, based on the total number of atoms of all elements in the soft magnetic foil.

The soft magnetic foil of the present disclosure has an oxide film on the surface.

The thickness of the oxide film is usually about $1/1000$ of the soft magnetic foil, i.e., about 100 nm or less, 30 nm to 80 nm in some embodiments, and 30 nm to 50 nm in other embodiments.

The oxide film is ferrite and has the same crystal structure as hematite ($Fe_2O_3$). The crystal structure of the oxide film can be verified by, for example, thin-film X-ray diffraction.

In the present disclosure, the soft magnetic foil has an oxide film on the surface, and thus an insulating layer does not have to be disposed between every two soft magnetic foils, and is disposed for every strip laminate composed of a plurality of layers of the soft magnetic foil, which will be described below. Accordingly, a loss ratio can be reduced while maintaining a high space factor. It is presumed that this effect is provided by the oxide film that has insulating action to prevent electrical conduction between the soft magnetic foils when the soft magnetic foils are laminated, but the present disclosure is not limited to this presumption.

The soft magnetic foil of the present disclosure can be produced by a method heretofore known in the art and, for example, can be produced by a single-roll liquid quenching method. In the single-roll liquid quenching method, the soft magnetic foil can be produced, for example, with a liquid quenching-solidifying apparatus NAV-A3 manufactured by Nissin Giken Corporation by bringing the melting chamber into a high vacuum state, then purging the melting chamber with argon gas, subjecting the mother alloy in the nozzle to high-frequency melting to form a molten alloy, and after a predetermined temperature is reached, promptly discharging the alloy onto the suffice of a rapidly rotating copper roll from the nozzle opening. As for the single-roll liquid quenching method, see, for example, Keiyu Nakagawa et. al., "The Effect of the Jetting Temperature on the Fabrication of Rapidly Solidified Fe—Si—B Systems Alloys Using Single Roller Melt Spinning", J. Japan Inst. Met. Mater., Vol. 73, No. 10 (2009), pp. 764-767. The surface of a soft magnetic foil produced in this manner has the aforementioned oxide film.

In the present disclosure, the strip laminate is a laminate composed of at least two layers, 2 layers to 20 layers in some embodiments, and 5 layers to 10 layers in some other embodiments, of the soft magnetic foil.

Accordingly the overall thickness of the strip laminate is usually 20 to 700 μm, 50 μm to 500 μm in some embodiments, and 100 μm to 300 μm in some other embodiments.

In the present disclosure, the insulating layer is a layer formed of an insulator, and an insulator heretofore known in the art is usable in the insulating layer. The insulating layer contains, but is not limited to, a thermosetting epoxy resin, an alkyd resin, a polyimide resin, a polyamide-imide resin, or an imide-modified acrylic resin. The insulating layer may further contain an inorganic filler.

The resistance value of the insulating layer in the present disclosure is usually 1000 Ω·m or more, and 1000 Ω·m to 5000 Ω·m in some embodiments. The thickness of the insulating layer is not limited, and is usually set such that the insulating layer has the above resistance value.

In the laminate of the present disclosure, the insulating layer is disposed on the surface of the strip laminate, and the strip laminate and the insulating layer are alternately disposed. Accordingly, the insulating layer is disposed between the strip laminates.

FIG. 1 shows one example of the laminate structure of the present disclosure. In the laminate of the present disclosure shown in FIG. 1, a first strip laminate formed by laminating five layers of a soft magnetic foil 1 is laminated on a first insulating layer 2, a second insulating layer 2 is laminated on the upper surface of the first strip laminate, a second strip laminate formed by laminating five layers of the soft magnetic foil 1 is formed on the second insulating layer 2, a third insulating layer 2 is laminated on the upper surface of the second strip laminate, a third strip laminate formed by laminating five layers of the soft magnetic foil 1 is formed on the third insulating layer 2, and a fourth insulating layer 2 is laminated on the upper surface of the third strip laminate.

In the laminate of the present disclosure, one insulating layer is disposed for every strip laminate that is formed of a plurality of layers of a soft magnetic and thus the volume fraction of the insulating layer in the laminate can be smaller than that of a conventional laminate having one insulating layer for every layer of a soft magnetic metal strip, and the performance, such as magnetic properties, per unit volume of the laminate can be improved.

The laminate of the present disclosure can be used in a core such as a reactor core or a transformer core in addition to a motor core or a stator core.

The laminate of the present disclosure can be produced by a lamination method heretofore known in the art.

For example, the laminate of the present disclosure can be formed by alternately laminating the insulating layer and the strip laminate that is formed by laminating the aforementioned number of layers of a soft magnetic foil. That is to say, the laminate of the present disclosure can be produced by, first, laminating the aforementioned number of layers of a soft magnetic foil to form a first strip laminate, next forming a first insulating layer on the surface of the first strip laminate, further laminating the aforementioned number of layers of a soft magnetic foil on the surface of the first insulating layer to form a second strip laminate, then forming a second insulating layer on the surface of the second strip laminate, and further repeating the above steps until the desired laminate thickness is attained.

EXAMPLES

Below, the present disclosure will now be described by way of several examples, but the examples are not intended to limit the present disclosure.

Laminates were prepared in the following Comparative Examples 1 to 3 and Examples 1 to 4. The soft magnetic foil used when preparing the laminates of Comparative Examples 1 and 2 and Examples 1 to 4 was a quenched foil that was prepared by a quenching method and contained Fe in a proportion of 80 at % or more. The soft magnetic foil had a thickness of 25 μm, and a thickness of an oxide film as determined from a TEM image was about 50 nm.

Comparative Example 1

A laminate having a thickness of about 26 μm was prepared by laminating one layer of the soft magnetic foil and one insulating layer (1 μm, an insulation resistance value of 1000 Ω·m).

Comparative Example 2

A laminate having a thickness of about 751 μm was prepared by laminating 30 layers of the soft magnetic foil and one insulating layer (1 μm, an insulation resistance value of 1000 Ω·m).

Comparative Example 3

A laminate having a thickness of about 251 μm was prepared by laminating one electromagnetic steel sheet (250 μm, 3% silicon-Fe, provided with an oxide film, prepared by rolling) and one insulating layer (1 μm, an insulation resistance value of 1000 Ω·m).

Example 1

A laminate having a thickness of about 51 μm was prepared by laminating two layers of the soft magnetic foil and one insulating layer (1 μm, an insulation resistance value of 1000 Ω·m).

Example 2

A laminate having a thickness of about 126 μm was prepared by laminating five layers of the soft magnetic foil and one insulating layer (1 μm, an insulation resistance value of 1000 Ω·m).

Example 3

A laminate having a thickness of about 251 μm was prepared by laminating ten layers of the soft magnetic foil and one insulating layer (1 μm, an insulation resistance value of 1000 Ω·m).

Example 4

A laminate having a thickness of about 501 μm was prepared by laminating twenty layers of the soft magnetic foil and one insulating layer (1 μm, an insulation resistance value of 1000 Ω·m).

The loss ratios and the space factors of the laminates prepared in Comparative Examples 1 to 3 and Examples 1 to 4 were measured.

The loss ratio was measured by a method involving sandwiching a laminate between excitation cores, applying compressive stress in the lamination direction of the laminate, measuring magnetic flux density B and magnetic field strength H, and calculating the area of the BH locus.

The space factor was calculated according to the following formula:

Space factor=((Thickness of soft magnetic foil or electromagnetic steel sheet×Number of laminated layers)/(Thickness of laminate)×100

Figure 2:
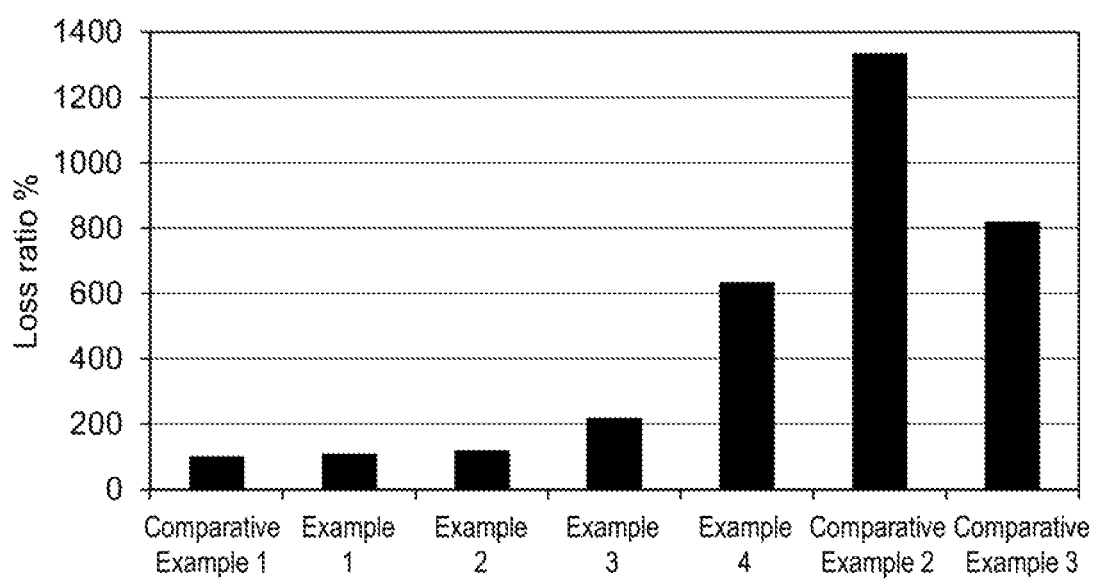
FIG. 2 shows the loss ratios of Comparative Examples 1 to 3 and Examples 1 to 4.

FIG. 2 shows the loss ratios of Comparative Examples 1 to 3 and Examples 1 to 4. The loss ratios in FIG. 2 are relative values with the loss ratio of Comparative Example 1 being 100%. In the bar chart of FIG. 2, Comparative Examples 1 and 2 and Examples 1 to 4 are arranged from the left according to the number of layers of the soft magnetic foil between an insulating layer and an insulating layer, i.e., so that the number of layers of the soft magnetic foil in the strip laminate is increased, and the result of Comparative Example 3 which is a conventional laminate product prepared by alternately laminating an electromagnetic steel sheet and an insulating layer is shown on the far right. From FIG. 2, it was found that the loss ratio tended to be exponentially increased as the number of layers of the soft magnetic foil in the strip laminate was increased. It was found that when the number of layers of the soft magnetic foil in the strip laminate was 20 or smaller, the loss ratio was smaller than that of Comparative Example 3 which was a conventional product.

Figure 3:
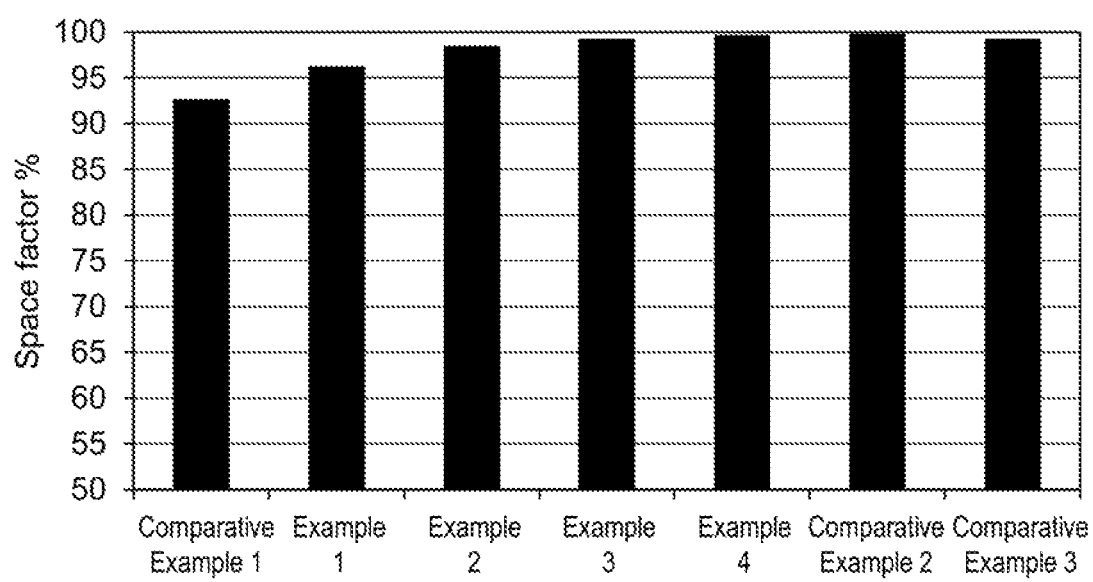
FIG. 3 Shows the space factors of Comparative Examples 1 to 3 and Examples 1 to 4.

FIG. 3 shows the space factors of Comparative Examples 1 to 3 and Examples 1 to 4. In the bar chart of FIG. 3, Comparative Examples 1 and 2 and Examples 1 to 4 are arranged from the left according to the number of layers of the soft magnetic foil between an insulating layer and an insulating layer, i.e., so that the number of layers of the soft magnetic foil in the strip laminate is increased, and the result of Comparative Example 3 which is a conventional laminate product prepared by alternately laminating an electromagnetic steel sheet and an insulating layer is shown on the far right. From FIG. 3, it was found that the space factor tended to be increased as the number of layers of the soft magnetic foil in the strip laminate was increased. It was found that the space factor exceeded 95% when the number of layers of the soft magnetic foil in the strip laminate was two, in particular the space factor exceeded 98% when the number of layers of the soft magnetic foil in the strip laminate was five, and the space factor is nearly 100% when the number of layers of the soft magnetic foil in the strip laminate was five or greater.

In general, a motor is required to exert a reduced loss and an increased space factor. Since the soft magnetic foil used in the present disclosure is extremely thin, the properties of the laminate greatly vary depending on how the insulating layers are disposed. According to the present disclosure, it was found that in a laminate of soft magnetic strips, the low loss and the high space factor of the laminate can be simultaneously achieved by using at least two layers, 2 to 20 layers in some embodiments, and 5 to 10 layers in some other embodiments, of the soft magnetic foil having a thickness of 25 μm.

All publications, patents and patent applications cited in the present description are herein incorporated by reference as they are.

DESCRIPTION OF SYMBOLS

1 Thin soft magnetic metal strip (soft magnetic foil)
2 Insulating layer

What is claimed is:

1. A laminate for use in a core, comprising:
at least one strip laminate composed of soft magnetic metal strips; and
at least one insulating layer provided on a surface of the strip laminate, wherein:
each one layer of the soft magnetic metal strips has a thickness of 100 μm or less,
each one layer of the soft magnetic metal strips has an oxide film on surfaces thereof, the oxide film having a thickness in the range of from 30 nm to 100 nm,
the strip laminate is composed of at least two layers of the soft magnetic metal strip, and
the strip laminate and the insulating layer are alternately disposed.

2. The laminate according to claim 1, wherein each one layer of the soft magnetic metal strips has a thickness of 10 μm to 100 μm, and the strip laminate is composed of 2 layers to 20 layers of the soft magnetic metal strip.

3. The laminate according to claim 1, wherein each one layer of the insulating layers has a resistance value in the range of from 1000 Ω·m to 5000 Ω·m.

4. The laminate according to claim 2, wherein each one layer of the insulating layers has a resistance value in the range of from 1000 Ω·m to 5000 Ω·m.

5. A core comprising the laminate according to claim 1.

6. The laminate according to claim 1, wherein the oxide film consists of ferrite with a hematite crystal structure.

7. The laminate according to claim 1, wherein each one layer of the soft magnetic metal strips comprises Cobalt (Co) in an amount of 80 at % or more based on the total number of atoms of all elements in the soft magnetic metal strip.

8. The laminate according to claim 1, wherein each one layer of the insulating layers has a thickness of 1 μm or less.

9. The laminate according to claim 3, wherein each one layer of the insulating layers has a thickness of 1 μm or less.

10. A laminate for use in a core, comprising:
at least one strip laminate composed of soft magnetic metal strips; and
at least one insulating layer provided on a surface of the strip laminate, the insulating layer having a thickness of 1 μm or less,
wherein:
each one layer of the soft magnetic metal strips has a thickness of 100 μm or less,
each one layer of the soft magnetic metal strips has an oxide film on surfaces thereof,
each one layer of the insulating layers has a thickness of 1 μm or less,
the strip laminate is composed of at least two layers of the soft magnetic metal strip, and
the strip laminate and the insulating layer are alternately disposed.

11. The laminate according to claim 10, wherein each one layer of the insulating layers has a resistance value in the range of from 1000 Ω·m to 5000 Ω·m.

12. A laminate for use in a core, comprising:
at least one strip laminate composed of soft magnetic metal strips; and
at least one insulating layer provided on a surface of the strip laminate, wherein:
each one layer of the soft magnetic metal strips has a thickness of 100 μm or less,
each one layer of the soft magnetic metal strips has an oxide film on surfaces thereof,
each one layer of the insulating layers has a resistance value in the range of from 1000 Ω·m to 5000 Ω·m,
the strip laminate is composed of at least two layers of the soft magnetic metal strip, and
the strip laminate and the insulating layer are alternately disposed.

* * * * *